United States Patent
Shu et al.

(10) Patent No.: US 11,580,290 B2
(45) Date of Patent: Feb. 14, 2023

(54) TEXT DESCRIPTION GENERATING METHOD AND DEVICE, MOBILE TERMINAL AND STORAGE MEDIUM

(71) Applicant: BEIJING DAJIA INTERNET INFORMATION TECHNOLOGY CO., LTD., Beijing (CN)

(72) Inventors: Ying Shu, Beijing (CN); Ke Fang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 178 days.

(21) Appl. No.: 16/845,533

(22) Filed: Apr. 10, 2020

(65) Prior Publication Data

US 2020/0242296 A1 Jul. 30, 2020

(30) Foreign Application Priority Data

Apr. 11, 2019 (CN) .......................... 201910291254.6

(51) Int. Cl.
*G06F 3/048* (2013.01)
*G06F 40/10* (2020.01)
*G10L 17/00* (2013.01)
*G06V 20/40* (2022.01)

(52) U.S. Cl.
CPC .............. *G06F 40/10* (2020.01); *G06V 20/40* (2022.01); *G10L 17/00* (2013.01)

(58) Field of Classification Search
CPC ............................ G06F 40/10; G06K 9/00711
See application file for complete search history.

(56) References Cited

U.S. PATENT DOCUMENTS

| | | | | |
|---|---|---|---|---|
| 10,460,023 B1* | 10/2019 | Shriver | ................ | G06F 3/0482 |
| 10,671,854 B1* | 6/2020 | Mahyar | .................. | G06N 20/00 |
| 10,733,230 B2* | 8/2020 | Jo | ....................... | G06K 9/00248 |
| 11,102,441 B2* | 8/2021 | Fu | ...................... | H04N 21/4782 |
| 2005/0022252 A1* | 1/2005 | Shen | .................. | G06K 9/00711 |
| | | | | 725/135 |
| 2018/0018508 A1* | 1/2018 | Tusch | ................. | G06K 9/00771 |
| 2018/0060699 A1* | 3/2018 | Ghazali | ................. | G06K 9/628 |
| 2018/0350144 A1* | 12/2018 | Rathod | ................. | A63F 13/216 |
| 2019/0356949 A1* | 11/2019 | dePaz | ................ | H04N 21/4436 |
| 2020/0320592 A1* | 10/2020 | Soule | ..................... | G06V 20/20 |
| 2021/0209388 A1* | 7/2021 | Ciftci | .................. | G06K 9/00718 |
| 2022/0012296 A1* | 1/2022 | Marey | ................. | G06F 16/9538 |
| 2022/0351236 A1* | 11/2022 | D'Auria | ............. | G06Q 30/0242 |

FOREIGN PATENT DOCUMENTS

| CN | 105095211 A | 11/2015 |
|---|---|---|
| CN | 106254933 A | 12/2016 |
| CN | 109309844 A | 2/2019 |
| CN | 109429077 A | 3/2019 |
| CN | 109582945 A | 4/2019 |

* cited by examiner

*Primary Examiner* — David Phantana-angkool
(74) *Attorney, Agent, or Firm* — Meunier Carlin & Curfman LLC

(57) ABSTRACT

A text description generating method and device, a mobile terminal and a storage medium. The method of the embodiments of the present disclosure includes: obtaining the video content; performing text recognition according to the video content to obtain first text information, and displaying the first text information; and/or, generating second text information in response to user input operation on the video content, and displaying the second text information.

20 Claims, 5 Drawing Sheets

TEXT DESCRIPTION GENERATING METHOD AND DEVICE, MOBILE TERMINAL AND STORAGE MEDIUM

CROSS-REFERENCE REFERENCE TO RELATED APPLICATION

This application claims priority of Chinese Patent Application No. 201910291254.6, filed on Apr. 11, 2019, which is hereby incorporated by reference in its entirety.

FIELD

The present disclosures relates to the technical field of terminals, in particular to a text description generating method and device, a mobile terminal and a storage medium.

BACKGROUND

When part of video authors post videos to various platforms, they add text descriptions or content supplementary explanations about the videos or other text content that they want to share, such as the current mood in the platform posting process; and added text description content also effectively promotes interaction between ordinary users and the video authors. There are two ways to post videos.

First, posting a posted video; and second, creating a new video for posting. For the above two ways of posting videos, the operation of adding text descriptions is complicated.

SUMMARY

The first aspect of the present disclosure provides a text description generating method, wherein the method may include:

obtaining a video content;

performing a text recognition according to the video content to obtain a first text information, and displaying the first text information; and/or, generating a second text information in response to user input operation on the video content, and displaying the second text information.

The second aspect of the embodiments of the present disclosure provides a text description generating device, wherein the device may include:

a processor; and a memory for storing instructions executable to the processor;

wherein the processor is configured to execute the instructions to:

obtain a video content;

perform a text recognition according to the video content to obtain a first text information; and display the first text information;

and/or the processor is further configured to execute the instructions to generate a second text information in response to user input operation on the video content; and display the second text information.

The third aspect of the embodiments of the present disclosure provides a mobile terminal, wherein the mobile terminal may include:

a processor; and a memory for storing instructions executable to the processor;

wherein the processor is configured to execute the instructions to perform the text description generating method described in the first aspect and any optional implementation manner of the first aspect.

The fourth aspect of the embodiments of the present disclosure provides a non-temporary computer-readable storage medium, when instructions in the storage medium are executed by a processor of electronic equipment, the electronic equipment can execute the text description generating method described in the first aspect and any optional implementation manner of the first aspect.

The fifth aspect of the embodiments of the present disclosure provides a computer program product including instructions, when the computer program product operates on a computer, the computer executes the text description generating method described in the first aspect or any possible implementation mode of the first aspect of the application.

BRIEF DESCRIPTION OF THE DRAWINGS

In order to explain the technical solutions of the embodiments of the present disclosure more clearly, the drawings used in the description of the embodiments and the prior art are briefly introduced below. Obviously, the drawings in the following description are only some embodiments of the present disclosure, and other drawings can be obtained based on these drawings.

DETAILED DESCRIPTION OF THE EMBODIMENTS

The embodiments of the present disclosure provide a text description generating method and device, and a storage medium, which are used for quickly adding text information to video content, so that the richness of the video content and interaction with other users are enhanced, and therefore the community activity degree and health degree are increased.

In order to enable those skilled in the art to better understand the solutions of the present disclosure, the technical solutions in the embodiments of the present disclosure will be described below with reference to the accompanying drawings in the embodiments of the present disclosure. Obviously, the described embodiments are only a part of the embodiments of the application, and not all the embodiments. Embodiments based on the application should all belong to the protection scope of the application.

Embodiments of the present disclosure provide a text description generating method, video producers are assisted in quickly inputting titles or descriptions by identifying information such as video content, voice and text, so that the richness of the video content and interaction with other users are enhanced, and therefore the community activity degree and health degree are increased.

The embodiments of the present disclosure may be applied to a mobile terminal. The mobile terminal specifically may comprise, but is not limited to, a smartphone, a tablet computer, an e-book reader, an MP3 (Moving Picture Experts Group Audio Layer III) player, an MP4 (Moving Picture Experts Group Audio Layer IV) player, a laptop portable computer, a car computer, a desktop computer, a set-top box, a smart TV, wearable equipment, smart sound equipment and the like.

Figure 1:
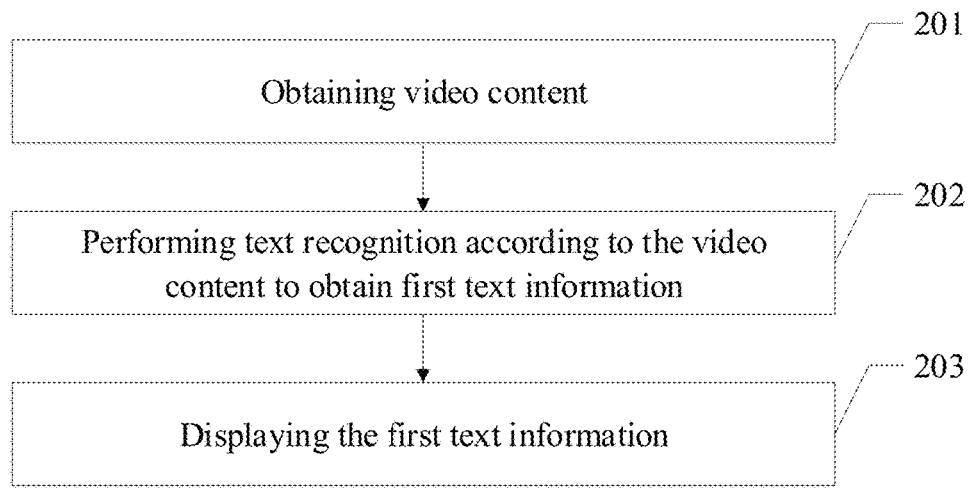
FIG. 1 is a schematic diagram of an embodiment of a text description generating method according to an embodiment of the present disclosure.

The technical solutions of the present disclosure are further described by way of embodiments. FIG. 1 is a schematic diagram of an embodiment of a text description generating method in an embodiment of the present disclosure, and the method may include:

201. obtaining video content.

Obtaining the video content through a mobile terminal may include the step that the video content is obtained through the mobile terminal and displayed on a first interface. Exemplarily, after a user edits the video content on the first interface of the mobile terminal, and video file information corresponding to the entire video content may include image information, audio information and covers.

Obtaining the video content may include the step: the video content is generated by the mobile terminal in response to user recording operation, or the recorded video content is clipped by the mobile terminal to obtain clipped video content. The video content may be short video content or video content similar to a movie or a TV series, which is not specifically limited herein.

202. Performing text recognition according to the video content to obtain first text information.

It should be understood that the step of performing text recognition according to the video content to obtain the first text information may include:

Implementation method 1: image recognition is performed according to the video content to obtain image content; and the image content is matched with a preset model to obtain first text description information, wherein the preset model is a model obtained by training according to pre-collected pictures and corresponding text descriptions.

Implementation method 2: voice recognition is performed according to the video content to obtain audio information; and second text description information is determined according to the audio information.

It should be understood that the mobile terminal performs (key frames) image recognition according to the video content, such as image content of a first frame, an end frame and inbetweens; voices (original sound tracks) are extracted and then transformed into texts; and text descriptions matched with the video content by a user are generated through an existing picture and text recognition method and other recognition methods.

The specific process includes the following parts.

First text description information is generated according to the video content. It should be understood that through the method, a data set about [pictures, corresponding text description information] is collected in advance, then a model that can generate text description information for pictures is obtained through training, afterwards frame extracting is performed on videos, text description information of each frame is obtained, and finally the text description information is extracted and integrated to obtain the first text description information.

Optical character recognition (OCR) is performed. Generally speaking, the video content includes a cover. The cover may be a picture with texts, so text recognition needs to be performed. The picture (such as denoising and rotating) is preprocessed at first, then row and column cutting is performed, all characters are cut from rows and columns, the characters are sent to a trained OCR model for character recognition to get results, and finally, the recognized characters are subjected to grammar correction to obtaining final texts (third text description information). It should be noted that the method is not limited to text recognition of the cover, and may also recognize texts as many as possible during video frame extraction.

Video voice recognition in videos is performed. Voice recognition is a relatively mature technology. Audio information is extracted from the video content through the mobile terminal, the audio information passes through an acoustic model in voice recognition to obtain a series of acoustic features, that is, the probability that a pronunciation corresponds to each acoustic symbol (can be understood as pronunciation). Then most likely candidate texts for these acoustic features (phoneticizing) are predicted through a language model. Finally, the optimal output sequence is found out for the candidate texts through decoding methods such as beam search, namely final voice-recognized texts (second text description information).

It should be noted that the first text information includes at least one of the first text description information, the second text description information or the third text description information, wherein the first text description information is information obtained through image content recognition, the second text description information is obtained through voice recognition, and the third text description information is information obtained by recognizing a cover (including the text part) in the video content.

It should be understood that the third text description information has priority over the second text description information, and the second text description information has priority over the first text description information. That is, the mobile terminal may determine the first text information according to the first text description information, the second text description information, and the third text description information. In the first text information, the weight of the third text description information is greater than that of the second text description information, and the weight of the second text description information is greater than that of the first text description information.

Exemplarily, when the mobile terminal recognizes and integrates the corresponding text description information through multiple channels to obtain the first text information, the text description information recognized by the multiple channels have different weights. For example: cover OCR recognition text (third text description information)>voice recognition extraction text (second text description information)>video generation text (first text description information), and finally the integrated text description information is recommended to a user.

Figure 2A:
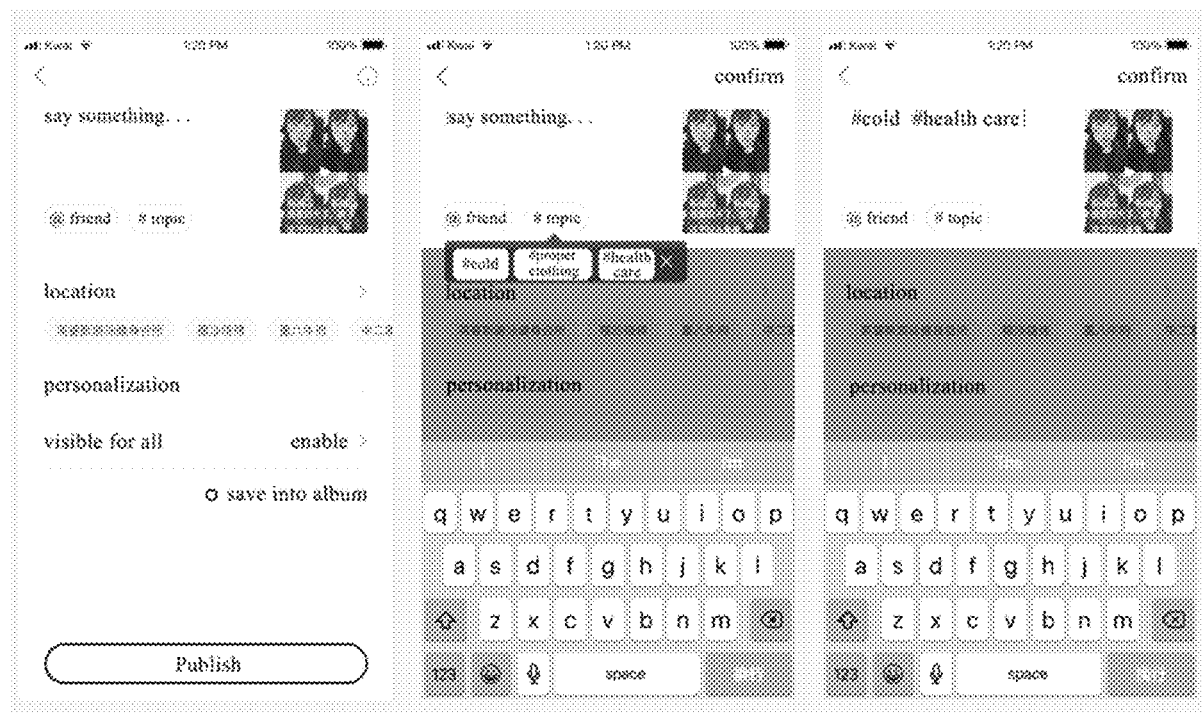
FIG. 2A is a schematic diagram of text information recognized through video content as text description information according to an embodiment of the present disclosure.
Figure 2B:
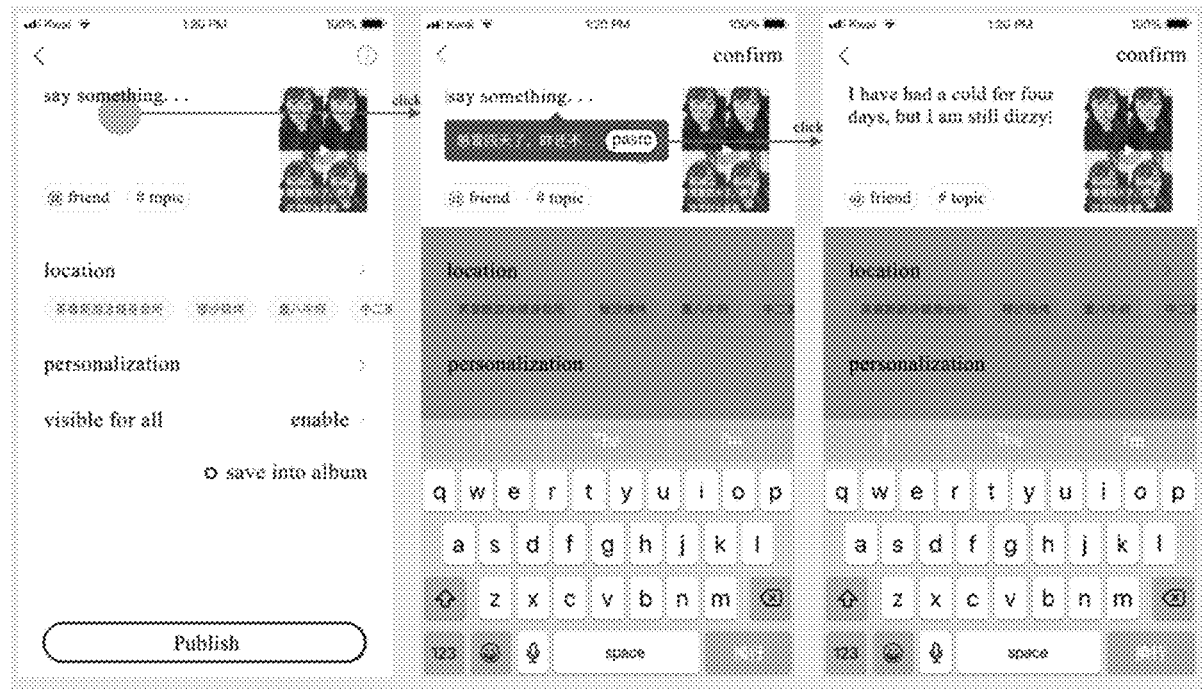
FIG. 2B is a schematic diagram of text information recognized through video content as a topic according to an embodiment of the present disclosure.

For example, the user takes a video of himself who was ill, "I have had a cold recently, and I am very uncomfortable and feel dizzy." is described in the video with voices, the user also adds the text of "I have had a cold for four days, but I am still dizzy.", then a background will recognize similar tags such as "Portrait" and "Sick Portrait", while the text recognized from original sound and the user-added text will be summarized and sorted, and finally the texts are used as a title or a description text to be recommended to the user. FIG. 2A is a schematic diagram of text information recognized through video content as a topic in an embodiment of the present disclosure; and FIG. 2B is a schematic diagram of text information recognized through video content as text description information in an embodiment of the present disclosure.

203: Displaying the first text information.

The video content is displayed on a first interface through the mobile terminal, wherein displaying the first text information may include the step: the first text information is displayed on the first interface, or the first text information is displayed on a second interface, or the first text information is displayed on the first interface and the second interface; wherein the first interface is an interface for displaying the video content, the second interface is an interface for displaying to-be-input text information, and the second interface is different from the first interface.

It should be understood that the way to obtain the first text information may include image recognition of the video content, or recognition of audio content in the video content, or recognition of texts in the video content, which is not limited here and can specifically refer to the description in step 202, and details are not described herein again.

Figure 2C:
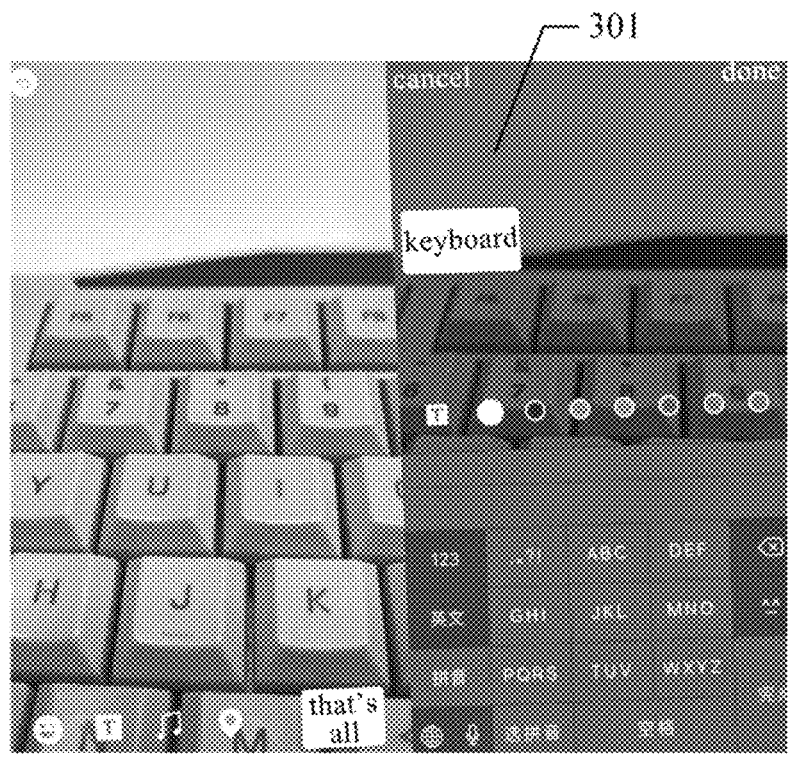
FIG. 2C is a schematic diagram of displaying first text information on a first interface according to an embodiment of the present disclosure.

Exemplarily, no text description information of the video content is input after the video content is obtained through the mobile terminal, text recognition may be performed according to the obtained video content through the mobile terminal to obtain the first text information, the recognized first text information is used as text description information, and the first text information is displayed on the first interface displaying the video content. FIG. 2C is a schematic diagram of displaying the first text information on the first interface in an embodiment of the present disclosure. As shown in FIG. 2C, an interface displaying a "keyboard" can be understood as a first interface 301.

Figure 2D:
FIG. 2D is a schematic diagram of displaying first text information on a second interface according to an embodiment of the present disclosure.

Further, the mobile terminal may switch from the first interface to the second interface in response to user switching operation, and display the first text information on the second interface. FIG. 2D is a schematic diagram of displaying the first text information on the second interface. As shown in FIG. 2D, the interface displaying the video content in a full screen can be understood as a first interface 302, and the interface displaying "a big snowfall and rosy clouds" can be understood as a second interface 303.

For example, for a video recorded by a user, the first interface can display the first text information of the video content or does not display the first text information. When the user shares the first text information on Moments, an input text interface (the second interface) of the Moments can directly display the first text information, and the user does not need to manually input text information.

Optionally, after the mobile terminal displays the first text information, the first text information is modified in response to user modification operation, and the modified first text information is displayed. That is, the user can edit the first text information displayed by the mobile terminal.

Exemplarily, when the user proceeds a posting process after recording the video, that is, the mobile terminal automatically pops up a bubble containing recommended description of the first text information in a text description area in response to posting input operation of the user, and the user can choose whether to paste the first text information or not; the user can choose to paste the first text information, or can also click anywhere in the screen to close the bubble; after pasting the first text information, the user can post the video, or the user can also post the video after editing the first text information.

It should be understood that the first text information may be a title, text description information or topic recommendation of the video content. That is, the first text information determined by the mobile terminal according to the video content can not only be directly applied to the title or description area of the video content, but also be automatically recommended as a topic, wherein, the video content of authors can be assisted in being posted in more platforms through the added topic, and meanwhile consumers are also assisted in finding videos with the appropriate content.

Optionally, in some embodiments of the present disclosure, the method may further include: the first text information is matched with information in a knowledge base to obtain first target text description information, wherein the information in the knowledge base includes recommended text description information related to the text information; and the first target text description information is displayed.

That is, the mobile terminal may also match the first text information with the information in the knowledge base to further obtain the first target text description information. It should be understood that the first text information (content labels or text description information) recognized in the first step can be secondarily processed, such as matching with information in some databases so as to obtain the same but more poetic or literary words capable of beautifying the overall work.

Exemplarily, the recognized and judged text information such as "Apricot blossom at Spring Outgoing", "Portrait" and "Beautiful Scenery" may be matched with a database of Tang Poems and Song Poems, then a poem of "During spring outgoing, apricot flowers blow all over the head. Who is the boy on the street? He is very romantic." that matches the scene is automatically recommended during posting, the user can choose to quickly paste the recommended text into the description to enhance the literariness of the overall work.

Optionally, the mobile terminal can add "During spring outgoing, apricot flowers blow all over the head. Who is the boy on the street? He is very romantic." on the video content in respond to the user input operation and then post the video content; or "During spring outgoing, apricot flowers blow all over the head. Who is the boy on the street? He is very romantic." may be used as the title or topic recommendation of the video content, which is not specifically limited.

In the embodiments of the present disclosure, the video content is obtained; and text recognition is performed according to the video content to obtain first text information; and the first text information is displayed. That is, the first text information can be obtained by text recognition according to the video content, the first text information can be automatically added, the user does not need to input the first text information again, and the text information can be quickly added to the video content, so that the richness of the video content and interaction with other users are enhanced, and therefore the community activity degree and health degree are increased.

Further, in the embodiments of the present disclosure, the mobile terminal may further secondarily process the first text information recognized according to the video content, for example, the first text information is matched with information in some databases so as to obtain the same but more poetic or literary words capable of beautifying the overall work.

Figure 3:
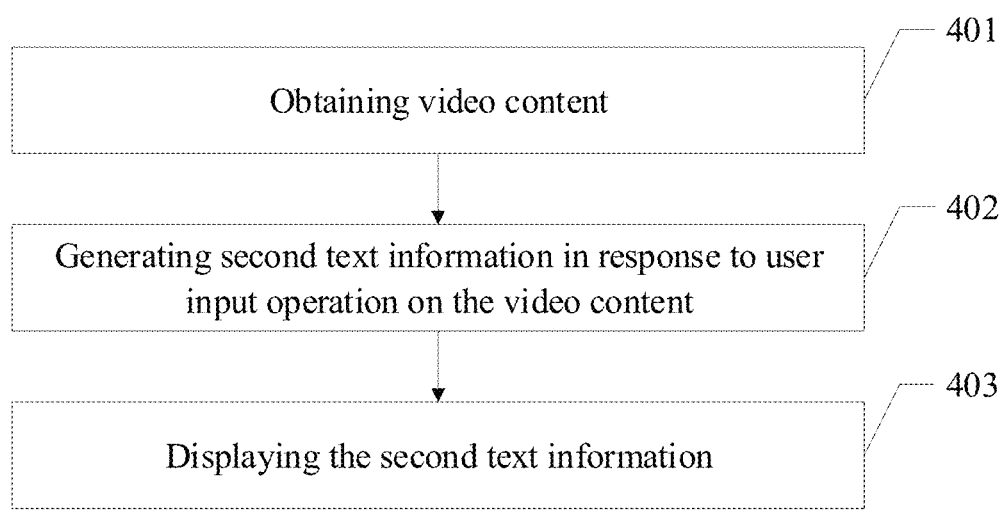
FIG. 3 is a schematic diagram of another embodiment of a text description generating method according to an embodiment of the present disclosure.

FIG. 3 is a schematic diagram of another embodiment of a text description generating method in an embodiment of the present disclosure, the method may include:

401. obtaining Video content.

Obtaining the video content through the mobile terminal may include the step: the video content is obtained through the mobile terminal and displayed on the first interface. Exemplarily, after a user edits the video content on the first interface of the mobile terminal, video file information corresponding to the entire video content may include image information, audio information and a cover.

Obtaining the video content may include the step: the video content is generated through the mobile terminal in response to user recording operation, or the recorded video content is clipped through the mobile terminal to obtain clipped video content. The video content may be short video content or video content similar to a movie or a TV series, which is not specifically limited herein.

402: Generating second text information in response to the user input operation on the video content.

Exemplarily, after the mobile terminal obtains the recorded video content, the user may input text description information about the video content in a text input box, for example: the video content is a video about cherry blossoms, and the text description information input by the user may be "April Rhapsody", then the mobile terminal generates second text information in response to the user input operation on the video content.

403. Displaying the second text information.

The video content is displayed on the first interface of the mobile terminal. Wherein displaying the second text information may include the step: the second text information is displayed on the first interface, and the second text information is displayed on the second interface; wherein the first interface is an interface for displaying the video content, the second interface is an interface for displaying to-be-input text information, and the second interface is different from the first interface.

Exemplarily, after the mobile terminal obtains the video content, the user inputs the text description information of the video content, and directly displays the second text information on the first interface displaying the video content, the mobile terminal switches from the first interface to the second interface in response to user switching operation, and the second text information is displayed on the second interface. For example, for a video recorded by the user, text description information can be input on the first interface of the video content as the second text information. When sharing to the Moments, the user can choose to directly copy and display the second text information on the text input interface (the second interface) of the Moments without manually inputting the text information again. Wherein, understanding of the first interface and the second interface may refer to the descriptions of FIG. 2C and FIG. 2D. It should be noted that in the embodiments of the present disclosure, the second text information displayed on the first interface is manually input by the user, and the second text information displayed on the second interface may be text information directly copied and pasted to the first interface to be displayed.

Optionally, after displaying the second text information, the mobile terminal modifies the second text information in response to user modification operation, and displays the modified second text information. That is, the user can edit the second text information displayed by the mobile terminal.

Exemplarily, when the user proceeds the posting process after recording the video, that is, the mobile terminal automatically pops up a bubble containing recommended descriptions of the first text information in a text description area in response to posting input operation of the user; the user can choose whether to paste the first text information or not; the user can choose to paste the first text information, or can also click any other area in a screen to close the bubble; and the user can post the video after pasting the first text information or can also edit the first text information and then post the video.

It should be understood that the second text information may be a title, text description information or topic recommendation of the video content. Reference may be made to FIG. 2A and FIG. 2B, and details are not described herein again. That is, the mobile terminal generates the second text information in response to user input operation on the video content, and the second text information can not only be directly applied to the title or description area of the video content, but also be automatically recommended as a topic. Wherein, the video content of authors can be assisted in being posted in more platforms through the added topic, and meanwhile consumers are also assisted in finding videos with the appropriate content.

Optionally, in some embodiments of the present disclosure, the method may further include: the second text information is matched with information in a knowledge base with to obtain second target text description information, where the information in the knowledge base includes recommended text description information related to the text information; and the second target text description information is displayed.

That is, the mobile terminal can also match the second text information with the information in the knowledge base to further obtain the second target text description information. It should be understood that the second text information (content labels or text description information and the like) recognized in the first step can be secondarily processed, for example the second text information is matched with information in some databases so as to obtain the same but more poetic or literary words capable of beautifying the overall work.

Exemplarily, recognized and judged text information such as "Qingming" and "Rain" can be matched with the database of Tang Poems and Song Poems, then the poem "A drizzling rain falls like tears on the Mourning Day; the mourner's heart is going to break on his way." that matches the scene is automatically recommended during posting, and a user can choose to quickly paste the recommended text into the description to enhance the literariness of the overall work.

Optionally, the mobile terminal can add "A drizzling rain falls like tears on the Mourning Day; the mourner's heart is going to break on his way." on the video content in respond to user input operation and then post the video content; or "A drizzling rain falls like tears on the Mourning Day; the mourner's heart is going to break on his way." may be used as the title or topic recommendation of the video content, which is not specifically limited.

In the embodiments of the present disclosure, the video content is obtained; the second text information is generated in response to the user input operation on the video content, and the second text information is displayed. The first text information can be automatically added, the user does not need to input the first text information again, and the text information can be quickly added to the video content, so that the richness of the video content and interaction with other users are enhanced, and therefore the community activity degree and health degree are increased.

Further, in the embodiments of the present disclosure, the mobile terminal may further secondarily process the second text information generated in response to the user input operation on the video content, for example, the second text information is matched with information in some databases so as to obtain the same but more poetic or literary words capable of beautifying the overall work.

It should be noted that in the foregoing embodiments, the first text information and the second text information may be the same or different, and are not specifically limited.

It should be understood that when steps 202 and 203 and steps 402 and 403 both exist, the mobile terminal may perform text recognition through according to the video content to obtain the first text information; second text information is generated in response to the user input operation on the video content; and when the first text information and the second text information are the same or similar, the first text information or the second text information may be displayed. Wherein, the situation that the first text information and the second text information are the same or similar can be understood as that the first text information and the second text information have the same or similar meanings. Further, similarity can be understood as that the similarity between the meanings represented by the first text information and the second text information is greater than a preset threshold. When the similarity between the first text information and the second text information is smaller than the preset threshold, the first text information and the second text information may not be displayed separately, the target text information may be determined according to the first text information and the second text information, and then the target text information is displayed.

It should be understood that in the case of performing text recognition according to the video content to obtain the first text information, and generating the second text information in response to the user input operation on the video content simultaneously, the process of displaying the text information may also include:

Step A1, when the similarity between the first text information and the second text information is greater than or equal to the preset threshold, displaying the first text information and/or the second text information.

It should be understood that when the first text information and the second text information are similar, the first text information and the second text information are interchangeable, and one of the foregoing interfaces may display the first text information or the second text information, or display both the first text information and the second text information simultaneously. Alternatively, the different interfaces display the first text information and the second text information correspondingly, which are not limited in the embodiments of the present disclosure.

Step A2: When the similarity between the first text information and the second text information is lower than the preset threshold, determining the target text information according to the first text information and the second text information.

Step A3: displaying the target text information.

The target text information is determined according to the first text information and the second text information, for example, the text information is obtained by combining the first text information and the second text information.

The target text information may be displayed on the first interface and/or the second interface.

It should further be noted that for displaying the text information, at least one of the target text information, the first text information and the second text information can be displayed on the first interface and/or the second interface.

The first text information may be displayed on the first interface, and the second text information and the target text information may be displayed on the second interface; or the first text information and the target text information are displayed on the first interface, and the second text information is on the second interface; or, the target text information are displayed on both the first interface and the second interface; or the first text information is displayed on the first interface, and the target text information is displayed on the second interface; or the target text information is displayed on the first interface, and the second text information is displayed on the second interface; or the first text information is displayed on the first interface, and the second text information is displayed on the second interface.

Further, the displayed target text information can be edited.

Figure 4A:
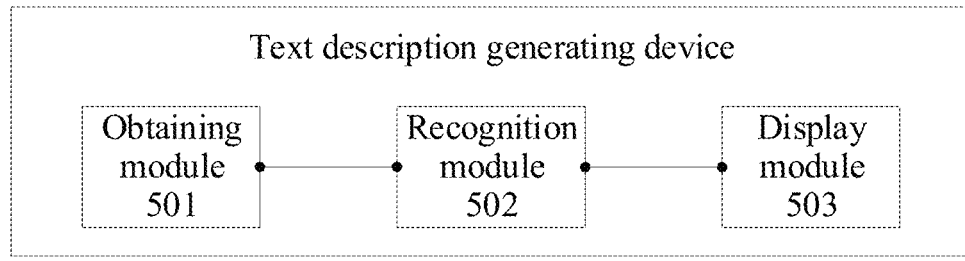
FIG. 4A is a schematic diagram of an embodiment of a text description generating device according to an embodiment of the present disclosure.

FIG. 4A is a schematic diagram of an embodiment of a text description generating device in an embodiment of the present disclosure, the device may include:

an obtaining module 501 configured to obtain video content;

a recognition module 502 configured to perform text recognition according to the video content to obtain first text information; and and/or a display module 503 configured to display the first text information;

the recognition module 502 is further configured to generate second text information in response to user input operation on the video content; and the display module 503 is further configured to display the second text information.

Optionally, in some embodiments of the present disclosure, the recognition module 502 is further configured to perform image recognition according to the video content to obtain image content, and match the image content with a preset model to obtain first text description information, wherein the preset model is a model obtained through training according to pre-collected pictures and corresponding text descriptions.

Optionally, in some embodiments of the present disclosure, the recognition module 502 is further configured to perform voice recognition according to the video content to obtain audio information, and determine second text description information according to the audio information.

Figure 4B:
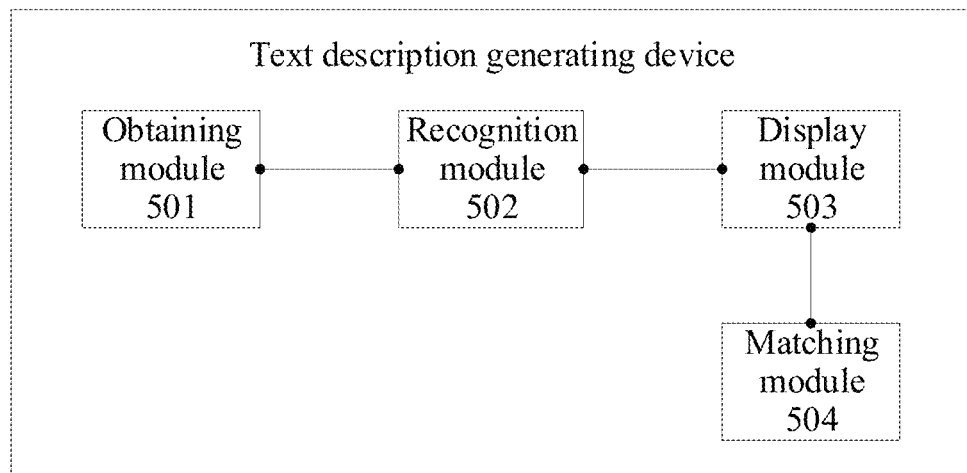
FIG. 4B is a schematic diagram of an embodiment of a text description generating device according to an embodiment of the present disclosure.

Optionally, in some embodiments of the present disclosure, FIG. 4B is a schematic diagram of an embodiment of a text description generating device in an embodiment of the present disclosure, and the device further includes:

a matching module 504 configured to match the first text information with information in a knowledge base to obtain first target text description information, wherein the information in the knowledge base includes recommended text description information related to the text information; and display the first target text description information is displayed.

Optionally, in some embodiments of the present disclosure, the matching module 504 is configured to match the second text information with information in a knowledge base to obtain second target text description information, wherein the information in the knowledge base includes recommended text description information related to the text information; and the second target text description information is displayed.

Optionally, in some embodiments of the present disclosure, the first text information is a title, text description information or topic recommendation of the video content.

Optionally, in some embodiments of the present disclosure, the second text information is a title, text description information or topic recommendation of the video content.

Optionally, in some embodiments of the present disclosure, the first text information includes at least one of the first text description information and the second text description information; wherein, the first text description information is information obtained according to image content recognition, and the second text description information is information obtained according to voice recognition.

Optionally, in some embodiments of the present disclosure, the obtaining module 501 is further configured to obtain the video content and display the video content on a first interface; and the display module 503 is further configured to display the first text information on the first interface, or display the first text information on a second interface, or display the first text information on the first interface and the second interface; wherein the first interface is an interface for displaying the video content, and the second interface is an interface for displaying to-be-input text information.

Optionally, in some embodiments of the present disclosure, the obtaining module 501 is further configured to obtain the video content and display the video content on a first interface; and the display module 503 is further configured to display the second text information on the first interface and a second interface; wherein the first interface is an interface for displaying the video content, and the second interface is an interface for displaying to-be-input text information.

Figure 5:
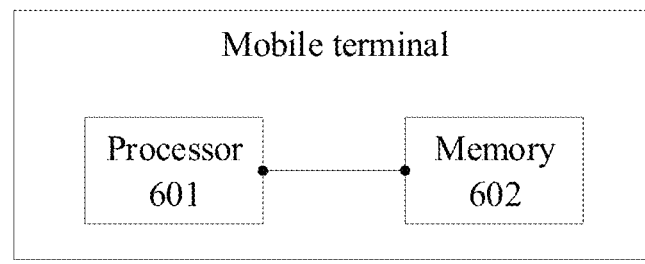
FIG. 5 is a schematic diagram of an embodiment of a mobile terminal according to an embodiment of the present disclosure.

FIG. 5 is a schematic diagram of an embodiment of a mobile terminal according to an embodiment of the present disclosure, and the mobile terminal may include:

a processor 601; and a memory 602 for storing instructions executable to the processor 601;

wherein the processor 601 is configured to execute the method described in the embodiments shown in FIG. 1 or FIG. 3.

Figure 6:
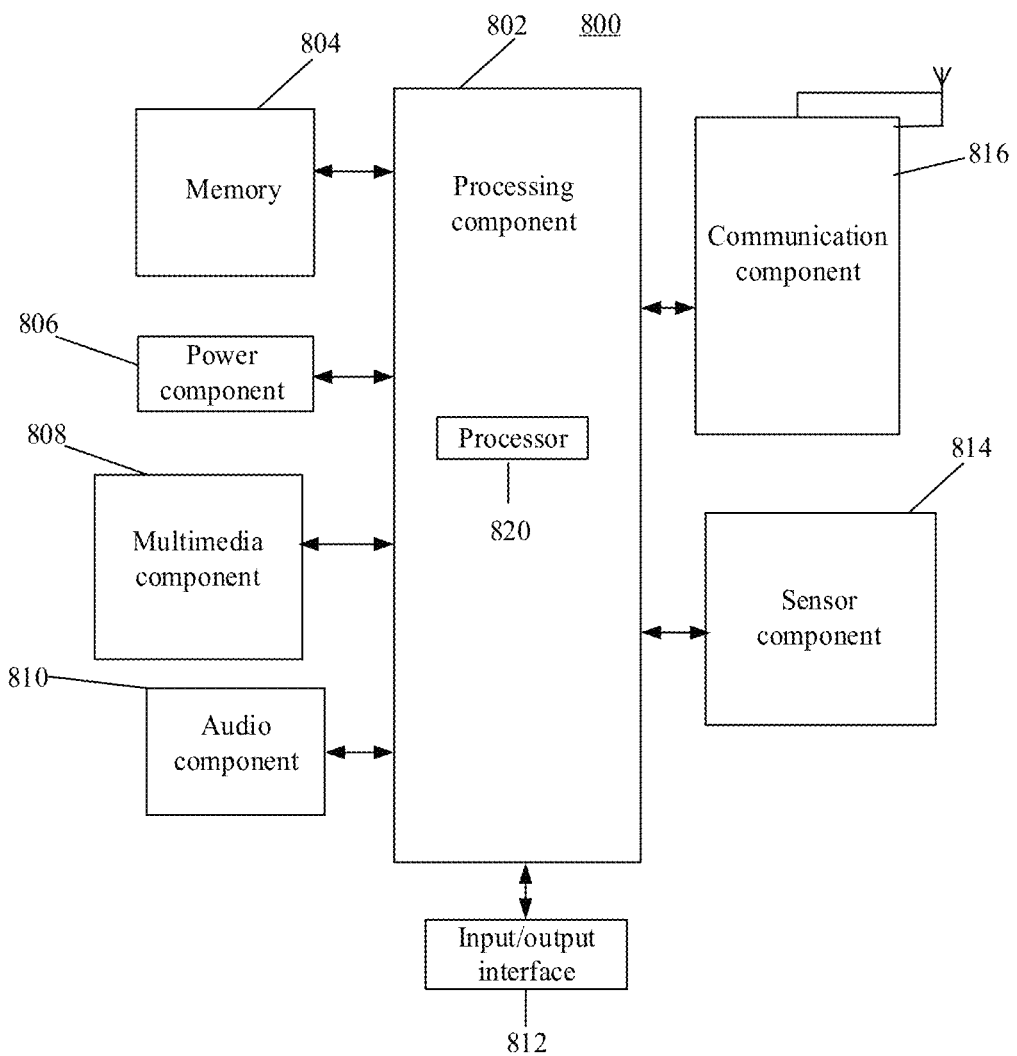
FIG. 6 is a block diagram showing a text description generating device according to an exemplary embodiment.

FIG. 6 is a block diagram of a text description generating device 800 according to an exemplary embodiment. For example, the device 800 may be a mobile phone, a computer, a digital broadcasting terminal, a message transmitter-receiver, a game console, tablet equipment, medical equipment, fitness equipment, a personal digital assistant and the like.

Referring to FIG. 6, the device 800 may include one or more of the following components: a processing component 802, a memory 804, a power component 806, a multimedia component 808, an audio component 810, an input/output (I/O) interface 812, a sensor component 814 and a communication component 816.

The processing component 802 generally controls overall operations of the device 800, such as operations associated with display, telephone call, data communication, camera operations and recording operations. The processing component 802 may include one or more processors 820 to execute instructions so as to complete all or part of the steps of the method described above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the device 800. Examples of these data include instructions for any application or method operating on the device 800, contact data, telephone directory data, messages, pictures, videos and the like. The memory 804 may be implemented by any type of volatile or non-volatile storage devices or a combination thereof, such as a static random access memory (SRAM), an electrically erasable programmable read-only memory (EEPROM), an erasable programming read-only memory (EPROM), a programmable read-only memory (PROM), a read-only memory (ROM), a magnetic memory, a flash memory, a magnetic disk or an optical disk.

The power component 806 supplies power to various components of the device 800. The power component 806 may include a power management system, one or more power sources, and other components associated with power generating, managing and distributing for the device 800.

The multimedia component 808 includes a screen that provides an output interface between the device 800 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touching, sliding and gestures on the touch panel. The touch sensor may not only sense a boundary of a touch or slide action, but also detect duration and pressure related to touch or slide operation. In some embodiments, the multimedia component 808 includes a front camera and/or a rear camera. When the device 800 is in an operating mode, such as a shooting mode or a video mode, the front camera and/or the rear camera can receive external multimedia data. Each front camera or each rear camera can be a fixed optical lens system or have focal length and optical zooming capabilities.

The audio component 810 is configured to output and/or input audio signals. For example, the audio component 810 includes a microphone (MIC). When the device 800 is in an operating mode, such as a calling mode, a recording mode and a voice recognition mode, the microphone is configured to receive an external audio signal. The received audio signal may be further stored in the memory 804 or transmitted via the communication component 816. In some embodiments, the audio component 810 further includes a loudspeaker for outputting the audio signal.

The I/O interface 812 provides an interface between the processing component 802 and a peripheral interface module. The peripheral interface module may be a keyboard, a click wheel, buttons or the like. These buttons may include, but are not limited to: a home button, a volume button, a start button and a lock button.

The sensor component 814 includes one or more sensors for providing status assessment of various aspects of the device 800. For example, the sensor component 814 can detect the on/off state of the device 800 and relative positioning of the components, such as a display and a keypad of the device 800. The sensor component 814 can also detect the change of the position of the device 800 or a component of the device 800, presence or absence of contact of a user with the device 800, the orientation or acceleration/deceleration of the device 800, and the temperature change of the device 800. The sensor component 814 may include a proximity sensor configured to detect the presence of nearby objects without any physical contact. The sensor component 814 may also include a light sensor, such as a CMOS or CCD image sensor, for use in imaging application. In some embodiments, the sensor component 814 may further include an acceleration sensor, a gyroscope sensor, a magnetic sensor, a pressure sensor or a temperature sensor.

The communication component 816 is configured to facilitate wired or wireless communication between the device 800 and other devices. The device 800 can access a wireless network based on a communication standard, such as WiFi, a carrier network (such as 2G, 3G, 4G or 5G), or a combination thereof. In one exemplary embodiment, the communication component 816 receives a broadcast signal or broadcast-related information from an external broadcast management system via a broadcast channel. In an exemplary embodiment, the communication component 816 further includes a near field communication (NFC) module to facilitate short-range communication. For example, the NFC module can be implemented based on a radio frequency identification (RFID) technology, an infrared data association (IrDA) technology, an ultra wideband (UWB) technology, a Bluetooth (BT) technology and other technologies.

In an exemplary embodiment, the device 800 may be implemented by one or more application-specific integrated circuits (ASICs), digital signal processors (DSPs), digital signal processing devices (DSPDs), programmable logic devices (PLDs), field-programmable gate arrays (FPGA), controllers, microcontrollers, microprocessors or other electronic components for performing the above method.

In an exemplary embodiment, a non-temporary computer-readable storage medium including instructions, such as a memory 804 including instructions, is further included, and the instructions can be executed by the processor 820 of the device 800 to complete the foregoing method. For example, the non-temporary computer-readable storage medium may be a ROM, a random access memory (RAM), a CD-ROM, a magnetic tape, a floppy disk, an optical data storage device and the like.

In the above embodiments, the storage medium may be implemented in whole or in part by software, hardware, firmware or any combination thereof. When implemented by the software, the storage medium may be implemented in whole or in part in the form of a computer program product.

The computer program product includes one or more computer instructions. When the computer program instructions are loaded and executed on a computer, all or part of the processes or functions according to the embodiments of the present disclosure are generated. The computer may be a general-purpose computer, a special-purpose computer, a computer network or other programmable devices. The computer instructions may be stored in a computer-readable storage medium, or transmitted from one computer-readable storage medium to another computer-readable storage medium, for example, the computer instructions may be transmitted from a website site, computer, server or data center to another website site, computer, server or data center in a wired (such as a coaxial cable, a fiber optic and a digital subscriber line (DSL)) or wireless (such as infrared, wireless or microwave) mode. The computer-readable storage medium may be any available medium that can be stored by a computer or data storage equipment such as a server and a data center including one or more available medium integration. The available medium may be a magnetic medium (such as a floppy disk, a hard disk and a magnetic tape), an optical medium (for example, a DVD), or a semiconductor medium (for example, a solid state disk (SSD)).

Those skilled in the art can clearly understand that for the convenience and brevity of descriptions, the specific working processes of systems, devices and units described above may refer to the corresponding processes in the foregoing method embodiments, and are not repeated here.

In the several embodiments provided in the application, it should be understood that the disclosed systems, devices, and methods may be implemented in other ways. For example, the device embodiments described above are only schematic. For example, division of units is only a logical function division, and there may be another division manner in actual implementation. For example, multiple units or components may be combined or may be integrated into another system, or some features can be ignored or not implemented. In addition, displayed or discussed mutual coupling or direct coupling or communication connection may be indirect coupling or communication connection through some interfaces, devices or units, which may be electrical, mechanical or in other forms.

The units described as separate components may or may not be physically separated, and the components displayed as units may or may not be physical units either, that is, may be located in one place, or may be distributed on multiple network units. Some or all of the units may be selected according to actual needs to achieve the objectives of the solutions of the embodiments.

In addition, all functional units in all the embodiments of the present disclosure may be integrated into one processing unit, or all the units may also exist separately and physically, or two or more units may be integrated into one unit. The above integrated units may be implemented in the form of hardware or in the form of software functional units.

When the integrated units are implemented in the form of software functional units and sold or used as independent products, the integrated units may be stored in a computer-readable storage medium. Based on the understanding, a part that contributes to the prior art or all or part of the technical solutions of the present disclosure essentially can be embodied in the form of a software product, the computer software product is stored in a storage medium, and includes a plurality of instructions for enabling computer equipment (which may be a personal computer, a server or network equipment) to perform all or part of the steps of the method described in the embodiments of the present disclosure. The aforementioned storage medium includes: a USB flash disk, a mobile hard disk, a read-only memory (ROM), a random access memory (RAM), a magnetic disk, an optical disk and other media that can store program codes.

The embodiments of the present disclosure further provide a non-temporary computer-readable storage medium, and when the instructions in the storage medium are executed by a processor of electronic equipment, the electronic equipment is enabled to execute the text description generating method described in the FIG. 1 and/or FIG. 4.

The fifth aspect of the embodiments of the present disclosure provides a computer program product containing instructions, when the instructions are executed on a computer, the computer is enabled to execute the text description generating method described in the FIG. 1 and/or FIG. 4.

As mentioned above, the above embodiments are only used to describe the technical solutions of the present disclosure, rather than limiting the present disclosure. Although the present disclosure has been described in detail with reference to the foregoing embodiments, those skilled in the art should understand that they can still modify the technical solutions described in the foregoing embodiments, or equivalently replace some of the technical features; and these modifications or replacements do not depart the essence of the corresponding technical solutions from the spirit and scope of the technical solutions of the embodiments of the present disclosure.

The invention claimed is:

1. A text description generating method, comprising:
obtaining a video content;
performing a text recognition according to the video content to obtain first text information, and displaying the first text information;
wherein the performing the text recognition according to the video content to obtain the first text information comprises:
extracting frames from the video content;
obtaining a text description information of each of the frames by matching each of the frames with a preset model,
wherein the preset model is a model obtained through training according to pre-collected pictures and corresponding text descriptions; and
obtaining a first text description information by integrating the text description information.

2. The method according to claim 1, wherein the performing the text recognition according to the video content to obtain the first text information comprises:
performing a voice recognition according to the video content to obtain an audio information; and
determining a second text description information according to the audio information.

3. The method according to claim 1, further comprises:
matching the first text information with information in a knowledge base to obtain a first target text description information, wherein the information in the knowledge base comprises a recommended text description information related to the text information; and displaying the first target text description information; or
matching the second text information with information in a knowledge base to obtain a second target text description information, wherein the information in the knowledge base comprises a recommended text description information related to the text information; and
displaying the second target text description information.

4. The method according to claim 1, wherein the first text information is a title, text description information or topic recommendation of the video content, or
the second text information is a title, text description information or topic recommendation of the video content.

5. The method according to claim 1, wherein the first text information comprises at least one of the first text description information and the second text description information;
wherein the first text description information is information obtained according to an image content recognition, and the second text description information is information obtained according to a voice recognition.

6. The method according to claim 1, wherein the obtaining the video content comprises:
obtaining the video content and displaying the video content on a first interface; and
the displaying the first text information comprises:
displaying the first text information on the first interface; or
displaying the first text information on a second interface; or
displaying the first text information on the first interface and the second interface;
wherein the first interface is an interface for displaying the video content, and the second interface is an interface for displaying text information to be input.

7. The method according to claim 1, wherein the obtaining the video content comprises:
obtaining the video content and displaying the video content on a first interface; and
the displaying the second text information comprises:
displaying the first text information on a second interface; or
displaying the second text information on the first interface and the second interface;
wherein the first interface is an interface for displaying the video content, and the second interface is an interface for displaying text information to be input.

8. A text description generating device, comprising:
a processor; and
a memory for storing instructions executable to the processor;
wherein the processor is configured to execute the instructions to:
obtain a video content;
perform a text recognition according to the video content to obtain a first text information; and
display the first text information;
wherein the processor is further configured to execute the instructions to extract frames from the video content, obtain a text description information of each of the frames by matching each of the frames with a preset model, and obtain a first text description information by integrating the text description information, wherein the preset model is a model obtained through training according to pre-collected pictures and corresponding text descriptions.

9. The device according to claim 8, wherein the processor is further configured to execute the instructions to perform a voice recognition according to the video content to obtain an audio information, and determine a second text description information according to the audio information.

10. The device according to claim 8, wherein the processor is further configured to execute the instructions to match the first text information with information in a knowledge base to obtain a first target text description information, wherein the information in the knowledge base comprises a recommended text description information related to the text information; and display the first target text description information.

11. The device according to claim 8, wherein the processor is further configured to execute the instructions to:
match the second text information with information in a knowledge base to obtain a second target text description information, wherein the information in the knowledge base comprises a recommended text description information related to the text information; and
display the second target text description information.

12. The device according to claim 8, wherein the first text information is a title, text description information or topic recommendation of the video content, or
the second text information is a title, text description information or topic recommendation of the video content.

13. The device according to claim 8, wherein the first text information comprises at least one of the first text description information and the second text description information;
   wherein the first text description information is information obtained according to an image content recognition, and the second text description information is information obtained according to a voice recognition.

14. The device according to claim 8, wherein the processor is further configured to execute the instructions to obtain the video content and display the video content on a first interface; and
   the processor is further configured to execute the instructions to display the first text information on the first interface, or display the first text information on a second interface, or display the first text information on the first interface and the second interface; wherein the first interface is an interface for displaying the video content, the second interface is an interface for displaying to-be-input text information, and the second interface is different from the first interface.

15. The device according to claim 8, wherein the processor is further configured to execute the instructions to obtain the video content and display the video content on the first interface; and
   the processor is further configured to execute the instructions to display the second text information on the first interface and the second interface; wherein the first interface is an interface for displaying the video content, the second interface is an interface for displaying text information to be input, and the second interface is different from the first interface.

16. A mobile terminal, comprising:
   a processor; and
   a memory for storing instructions executable to the processor;
   wherein the processor is configured to execute the instructions to perform the text description generating method according to claim 1.

17. A non-temporary computer-readable storage medium, wherein when instructions in the storage medium are executed by a processor of electronic equipment, the electronic equipment is enabled to execute the text description generating method according to claim 1.

18. A computer program product comprising instructions, when the computer program product operates on a computer, the computer executes the text description generating method according to claim 1.

19. The method according to claim 1, further comprises:
   generating second text information in response to user input operation on the video content, and displaying the second text information.

20. The device according to claim 8, wherein the processor is further configured to execute the instructions to generate a second text information in response to user input operation on the video content; and display the second text information.

* * * * *